(12) United States Patent
Miki

(10) Patent No.: US 10,992,378 B2
(45) Date of Patent: Apr. 27, 2021

(54) INFORMATION PROCESSING APPARATUS AND OPTICAL FIBER INSPECTION METHOD

(71) Applicant: FUJITSU LIMITED, Kanagawa (JP)

(72) Inventor: Atsushi Miki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/412,469

(22) Filed: May 15, 2019

(65) Prior Publication Data
US 2019/0379452 A1    Dec. 12, 2019

(30) Foreign Application Priority Data

Jun. 8, 2018    (JP) .............................. JP2018-110084

(51) Int. Cl.
*H04B 10/08*    (2006.01)
*H04B 10/079*    (2013.01)
*H04B 10/60*    (2013.01)

(52) U.S. Cl.
CPC ....... *H04B 10/07955* (2013.01); *H04B 10/60* (2013.01)

(58) Field of Classification Search
CPC .............. H04B 10/07955; H04B 10/60; H04B 10/0799; H04B 10/2507; H04B 10/25753; H04B 10/40; H04B 10/0795; H04B 2210/08; H04B 10/564; H04B 17/101; H04B 10/0777; H04B 10/03; H04B 10/0771; H04B 10/0775; H04B 10/07953; H04B 10/032; H04B 10/077; H04B 1/745; H04B 10/079; H04B 10/0793; H04B 17/29; H04B 17/24; H04B 17/318; H04J 14/0221; H04J 3/14; H04Q 11/0067; H04Q 2011/0083
USPC .............. 398/28, 25, 38, 15, 13, 17, 94, 197
See application file for complete search history.

(56) References Cited

U.S. PATENT DOCUMENTS

| | | | | |
|---|---|---|---|---|
| 2004/0075888 | A1* | 4/2004 | Eiselt .................. | H01S 3/13013 359/337.13 |
| 2008/0304825 | A1* | 12/2008 | Mahony ................. | H04B 10/03 398/38 |
| 2011/0003605 | A1* | 1/2011 | Song ................... | H04W 52/346 455/501 |
| 2011/0135298 | A1* | 6/2011 | Kokkinos ............ | H04B 10/071 398/15 |

(Continued)

FOREIGN PATENT DOCUMENTS

| | | |
|---|---|---|
| JP | 2016-57186 | 4/2016 |
| JP | 2016-226063 | 12/2016 |

*Primary Examiner* — Hibret A Woldekidan
(74) *Attorney, Agent, or Firm* — Fujitsu Patent Center

(57) ABSTRACT

An information processing apparatus of a first information processing apparatus coupled to a second information processing apparatus via an optical fiber, the information processing apparatus includes a memory, and a processor coupled to the memory and the processor configured to store, into the memory, a first reception power of an optical signal received via the optical fiber when an initial value is stored in the memory, store, into the memory, a second reception power of the optical signal received via the optical fiber when the first reception power is stored in the memory, and stop receiving the optical signal when a difference between the first reception power and the second reception power is equal to or greater than a first threshold value.

9 Claims, 12 Drawing Sheets

(56) References Cited

U.S. PATENT DOCUMENTS

| | | | |
|---|---|---|---|
| 2015/0229397 A1* | 8/2015 | Shibata | H04B 10/25753 398/115 |
| 2016/0020852 A1* | 1/2016 | Bato | H04B 10/296 398/34 |
| 2016/0142136 A1* | 5/2016 | Izumi | H04B 10/0799 398/38 |
| 2016/0285563 A1* | 9/2016 | Tanaka | H04B 10/69 |
| 2017/0268959 A1* | 9/2017 | Hayashi | G01M 11/333 |
| 2018/0309534 A1* | 10/2018 | Wey | H04B 10/0799 |

* cited by examiner

INFORMATION PROCESSING APPARATUS AND OPTICAL FIBER INSPECTION METHOD

CROSS-REFERENCE TO RELATED APPLICATION

This application is based upon and claims the benefit of priority of the prior Japanese Patent Application No. 2018-110084, filed on Jun. 8, 2018, the entire contents of which are incorporated herein by reference.

FIELD

The embodiments discussed herein are related to an information processing apparatus and an optical fiber inspection method.

BACKGROUND

In recent years, in communication between computers, optical communication is often used to meet the requirements of large transmission capacity and high communication speed. A device used for an optical communication is, for example, an optical fiber such as the AOC (Active Optical Cable).

The AOC is also used for connection between CPUs (Central Processing Units). For example, in an apparatus that performs a large-scale parallel computation, there is a case where a large number of AOCs are used for connection between CPUs.

The AOC has a signal conversion circuit that mutually converts an optical signal and an electric signal at opposite ends of an optical fiber. In addition, the signal conversion circuit includes a light emitting element and a light receiving element which transmit and receive an optical signal.

Related technologies for AOC are disclosed in, for example, Japanese Laid-open Patent Publication Nos. 2016-226063 and 2016-057186.

SUMMARY

According to an aspect of the embodiments, an information processing apparatus of a first information processing apparatus coupled to a second information processing apparatus via an optical fiber, the information processing apparatus includes a memory, and a processor coupled to the memory and the processor configured to store, into the memory, a first reception power of an optical signal received via the optical fiber when an initial value is stored in the memory, store, into the memory, a second reception power of the optical signal received via the optical fiber when the first reception power is stored in the memory, and stop receiving the optical signal when a difference between the first reception power and the second reception power is equal to or greater than a first threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The elements of the AOC are deteriorated depending on the use situation and elapsed years and affect the performance of the AOC. When a computer uses the AOC having a deteriorated element, for example, the computer may receive a signal with power lower than desired received power. In particular, in the case of a large-scale parallel computation, when the received power between CPUs is reduced, the computation precision may be lowered accordingly.

Embodiments of a technique of detecting deterioration of the AOC will now be described with reference to the accompanying drawings.

First Embodiment

Figure 1:
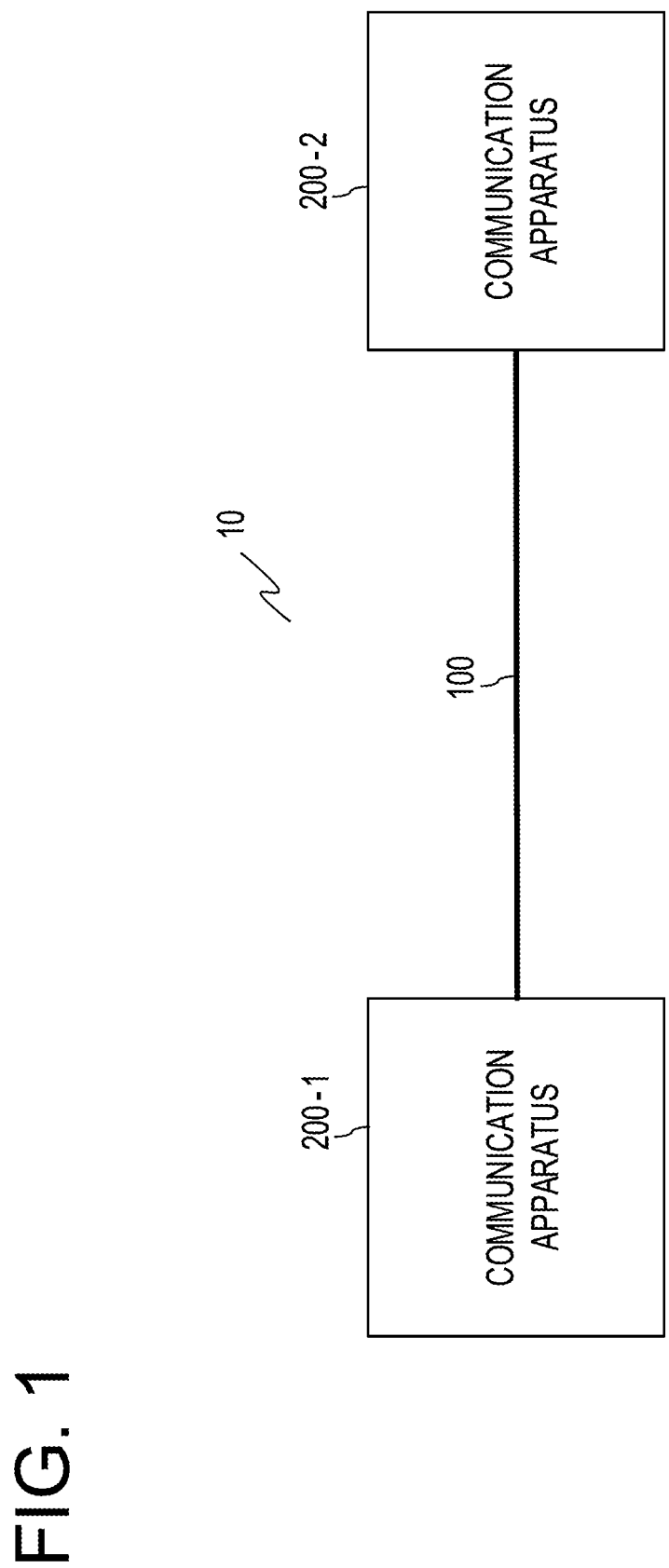
FIG. 1 is a view illustrating a configuration example of a communication system 10.

A first embodiment will be described below.
[Configuration Example of Communication System]
FIG. 1 is a view illustrating a configuration example of a communication system 10. The communication system 10 includes communication apparatuses 200-1 and 200-2 and an AOC 100. The communication system 10 is a system that provides communication between the communication apparatuses 200-1 and 200-2.

The communication apparatuses 200-1 and 200-2 (hereinafter, may be collectively referred to as a communication apparatus 200) are information processing apparatuses used by users of the communication system 10, and are, for example, computers or server machines. Two communication apparatuses 200 are illustrated in FIG. 1, but three or more communication apparatuses 200 may be used.

The AOC 100 is an optical cable (optical fiber) interconnecting the communication apparatuses 200. For example, the AOC 100 converts an electrical signal transmitted from the communication apparatus 200-1 to the communication apparatus 200-2 into an optical signal. Then, the AOC 100 transmits the obtained optical signal to the communication apparatus 200-2 serving as the transmission destination. Further, the AOC 100 converts the optical signal transmitted to the communication apparatus 200-2 into an electric signal and delivers the converted optical signal to the communication apparatus 200-2. This implements the transmission of a signal from the communication apparatus 200-1 to the communication apparatus 200-2.

For example, when the AOC 100 is connected between the communication apparatus 200-1 and the communication apparatus 200-2, the communication apparatus 200-1 determines whether the AOC 100 is deteriorated. For example, when a difference between received power at the initial connection in the AOC 100 (hereinafter, sometimes referred to as initial received power) and received power at the current or latest connection in the AOC 100 (hereinafter, sometimes referred to as latest received power) is equal to or larger than a predetermined value (first threshold value), the communication apparatus 200-1 determines that the AOC 100 is deteriorated.

[Configuration Example of Communication Apparatus]

Figure 2:
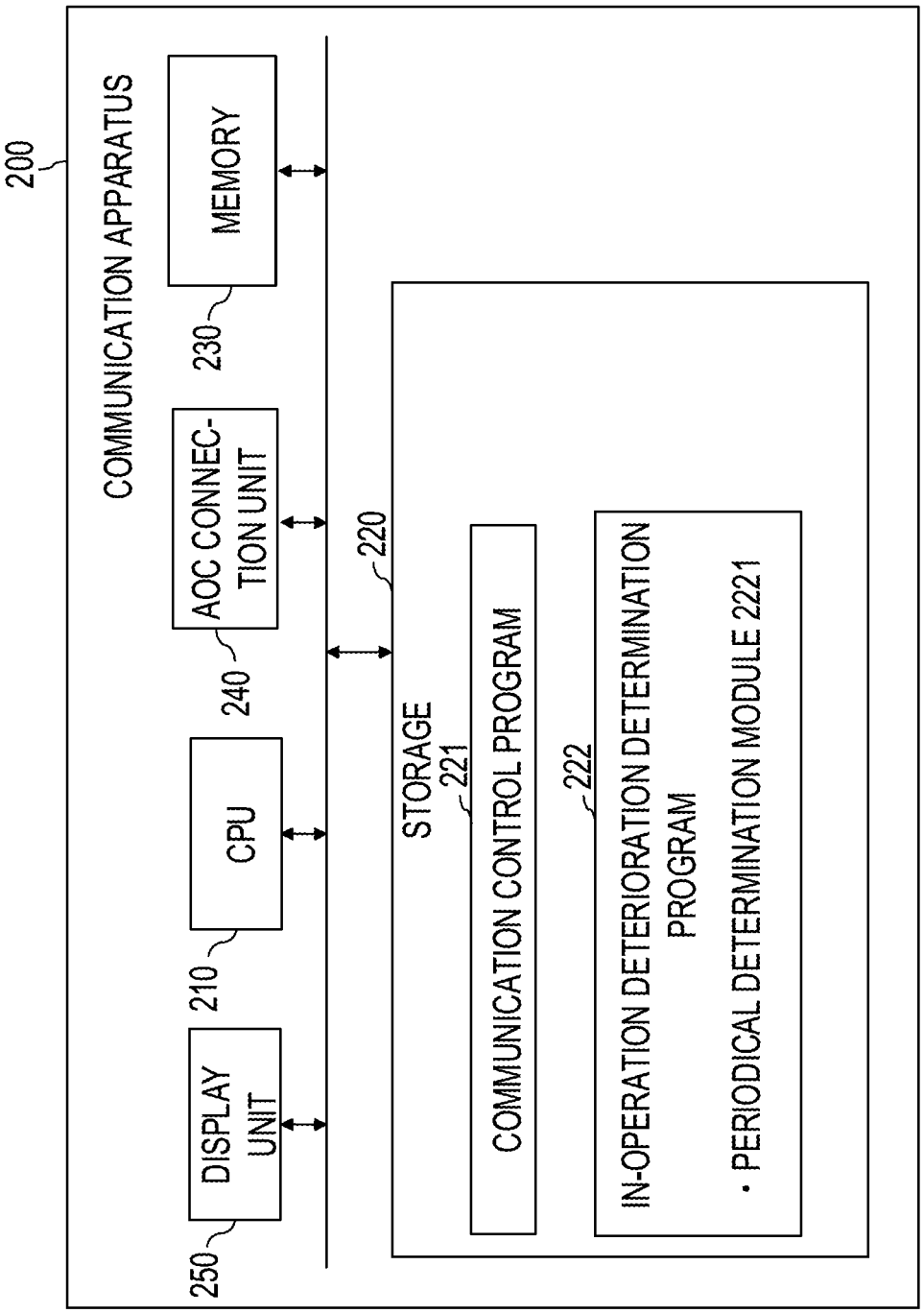
FIG. 2 is a view illustrating a configuration example of a communication apparatus 200.

FIG. 2 is a view illustrating a configuration example of the communication apparatus 200. The communication apparatus 200 is, for example, a computer and includes a CPU 210, a storage 220, a memory 230, and an AOC connection unit 240.

The storage 220 is an auxiliary storage device such as a flash memory, an HDD (Hard Disk Drive), or an SSD (Solid State Drive) that stores programs and data. The storage 220 stores a communication control program 221 and an in-operation deterioration determination program 222.

The memory 230 is an area in which the programs stored in the storage 220 are loaded. The memory 230 and the programs are also used as an area that stores data.

The AOC connection unit 240 is an interface that connects the AOC 100. For example, the AOC connection unit 240 receives an electric signal addressed to its own apparatus via the AOC 100 or transmits an electric signal addressed to another apparatus via the AOC 100.

The CPU 210 is a processor that loads the programs stored in the storage 220 into the memory 230 and executes the loaded programs to implement each process.

The CPU 210 performs a communication control process by executing the communication control program 221. The communication control process is a process of controlling communication with another communication apparatus connected via the AOC 100.

The CPU 210 executes the in-operation deterioration determination program 222 to construct a storage processing unit and a controller and perform an in-operation deterioration determination process. The in-operation deterioration determination process is a process of determining whether the AOC 100 is deteriorated. In the operation deterioration determination process, the communication apparatus 200 determines whether the AOC 100 is deteriorated at the time of connection of the AOC 100 and on a periodical basis.

The CPU 210 executes a periodic determination module 2221 included in the in-operation deterioration determination program 222 to construct a controller and perform a periodic determination process. The periodic determination process is a process of determining whether the AOC 100 is deteriorated at predetermined time intervals.

[Configuration Example of AOC]

Figure 3:
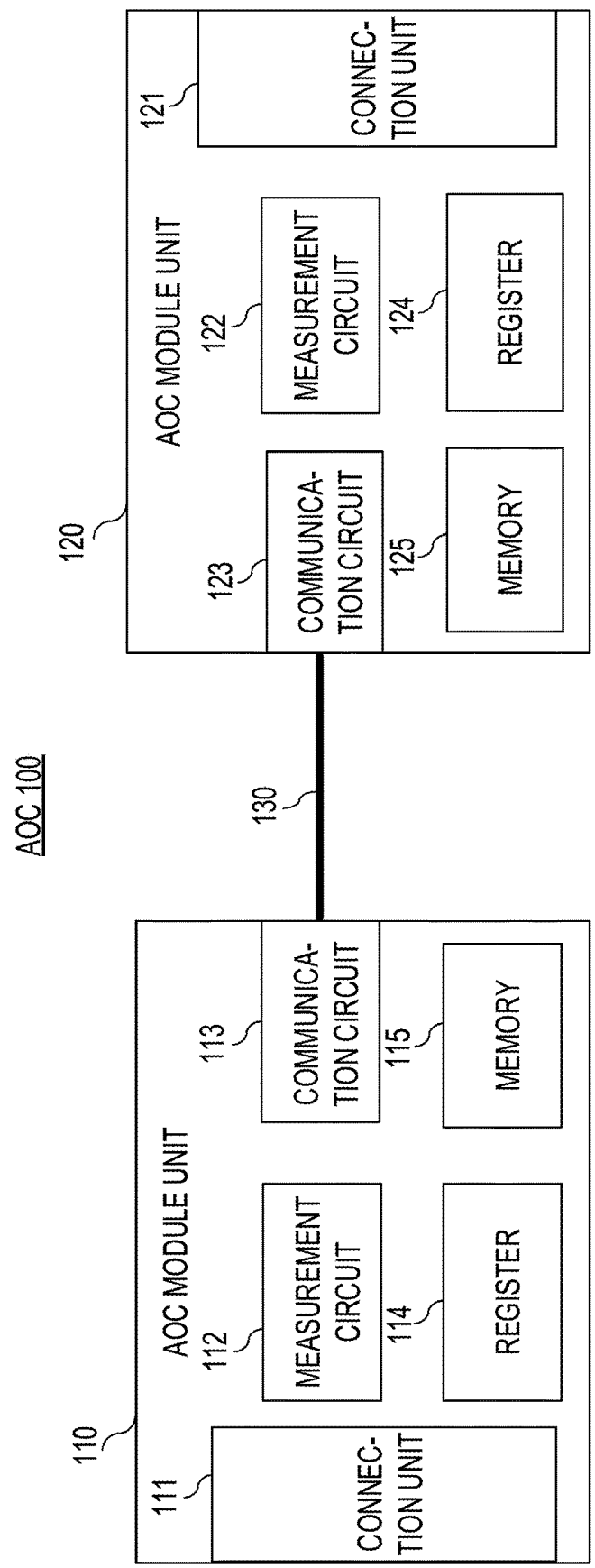
FIG. 3 is a view illustrating a configuration example of an AOC 100.

FIG. 3 is a view illustrating a configuration example of the AOC 100. The AOC 100 includes AOC modules 110 and 120 and an optical cable (optical fiber) 130. The AOC module 110 and the AOC module 120 are interconnected via the optical cable 130.

The AOC module 110 includes a connection unit 111, a measurement circuit 112, a communication circuit 113, a register 114, and a memory 115.

The connection unit 111 is an interface that connects with the communication apparatus 200. The AOC 100 is connected to the communication apparatus 200 via the connection unit 111. The connection unit 111 is connected to, for example, the AOC connection unit 240 of the communication apparatus 200.

The measurement circuit 112 is a circuit that measures received power. The measurement circuit 112 measures, for example, the RSSI (Received Signal Strength Indicator). For example, the measurement circuit 112 periodically measures the RSSI and stores a result of the measurement in a predetermined area of the register 114 (latest received power storage unit).

The communication circuit 113 is a circuit that performs a mutual conversion between an electric signal and an optical signal. The communication circuit 113 converts an optical signal received from the optical cable 130 into an electric signal and delivers the electric signal to the connected communication apparatus 200. Further, the communication circuit 113 receives an electric signal from the connected communication apparatus 200, converts the received electric signal into an optical signal, and delivers the optical signal to the optical cable 130. The communication circuit 113 has, for example, a light emitting element and a light receiving element.

The register 114 is a memory circuit (storage area) that stores the measurement result. The register 114 stores the latest measurement result (the latest received power). Further, the register 114 may store information other than the measurement result.

The memory 115 is a storage area that stores data. The memory 115 is, for example, a nonvolatile memory and is an area accessible from the connected communication apparatus 200. The memory 115 includes an initial received power storage unit in which the initial received power is stored. The initial received power indicates the initial RSSI measurement result at the time of first communication between the communication apparatuses 200 after the factory shipment of, for example, the AOC 100. Further, the memory 115 stores an initial value (e.g., 0) before communication between the communication apparatuses 200 (e.g., at the time of factory shipment). That is, the memory 115 stores the initial value before the initial received power is stored by the communication apparatus 200.

The AOC module 120 includes a connection unit 121, a measurement circuit 122, a communication circuit 123, a register 124, and a memory 125. The connection unit 121, the measurement circuit 122, the communication circuit 123, the register 124, and the memory 125 have the same configurations as the connection unit 111, the measurement circuit 112, the communication circuit 113, the register 114, and the memory 115 of the AOC module 110, respectively.

The optical cable 130 is a cable that connects between the AOC modules 110 and 120. The optical cable 130 delivers an optical signal received from the AOC module 110 to the AOC module 120. Further, the optical cable 130 may deliver an optical signal received from the AOC module 120 to the AOC module 110.

[In-Operation Deterioration Determination Process]

The communication apparatus 200 monitors the connection of the AOC 100 and executes an in-operation deterioration determination process S100. The in-operation deterioration determination process S100 is a process of making a determination on deterioration of the AOC 100 at the time of an AOC connection and then making a periodical determination on deterioration of the AOC 100.

Figure 4:
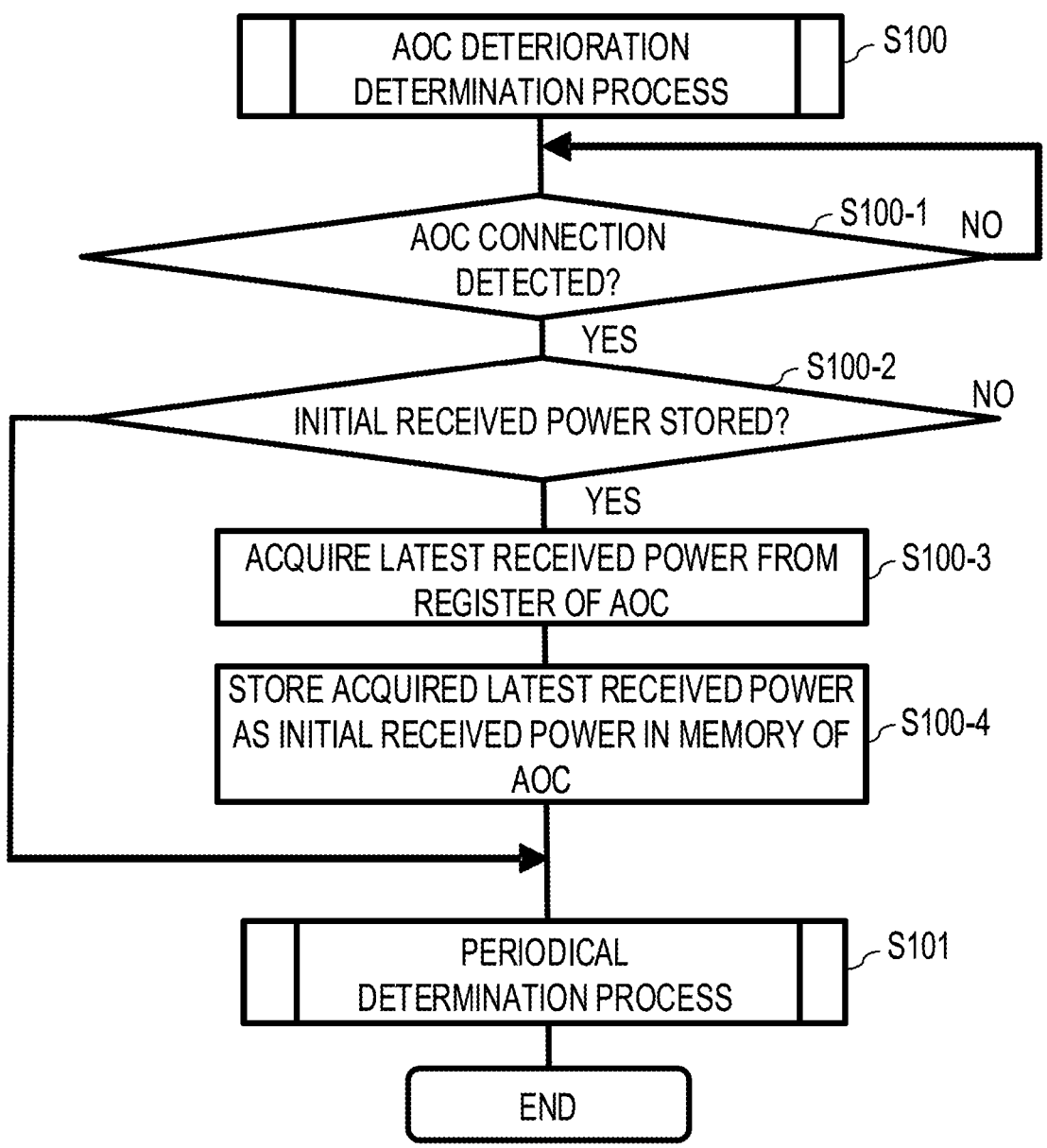
FIG. 4 is a view illustrating an example of a processing flowchart of an in-operation deterioration determination process S100.

FIG. 4 is a view illustrating an example of a processing flowchart of the in-operation deterioration determination process S100. In the in-operation deterioration determination process S100, the communication apparatus 200 monitors whether the AOC 100 is connected (S100-1).

When it is detected that the AOC 100 is connected ("Yes" in S100-1), the communication apparatus 200 acquires the initial received power from the memory of the connected AOC 100 (S100-2). The communication apparatus 200 acquires the initial received power by reading an area (initial received power storage unit) of the memory of the AOC 100 that stores the initial received power.

The communication apparatus 200 checks whether the initial received power has been stored in the memory of the AOC 100 (S100-2). When the value of the initial received power obtained in step S100-2 is an initial value (e.g., 0), the communication apparatus 200 determines that the initial received power has not been stored in the memory (i.e., an unconnected state).

When it is determined that the initial received power has not been stored ("No" in S100-2), the communication apparatus 200 acquires the latest received power (e.g., RSSI) from the register of the AOC 100 (S100-3). The communication apparatus 200 acquires the latest received power by reading an area (latest received power storage unit) of the register of the AOC 100 that stores the latest received power. The latest received power is periodically measured by, for example, the measurement circuit of the AOC 100 and is stored in the area of the register that stores the latest received power. Then, the communication apparatus 200 stores the acquired latest received power as the initial received power in the area of the memory of the AOC 100 that stores the initial received power (S100-4).

When it is determined that the initial received power has been stored ("Yes" in S100-2) or after performing step S100-4, the communication apparatus 200 performs a periodical determination process (S101) and ends the in-operation deterioration determination process S100.

Figure 5:
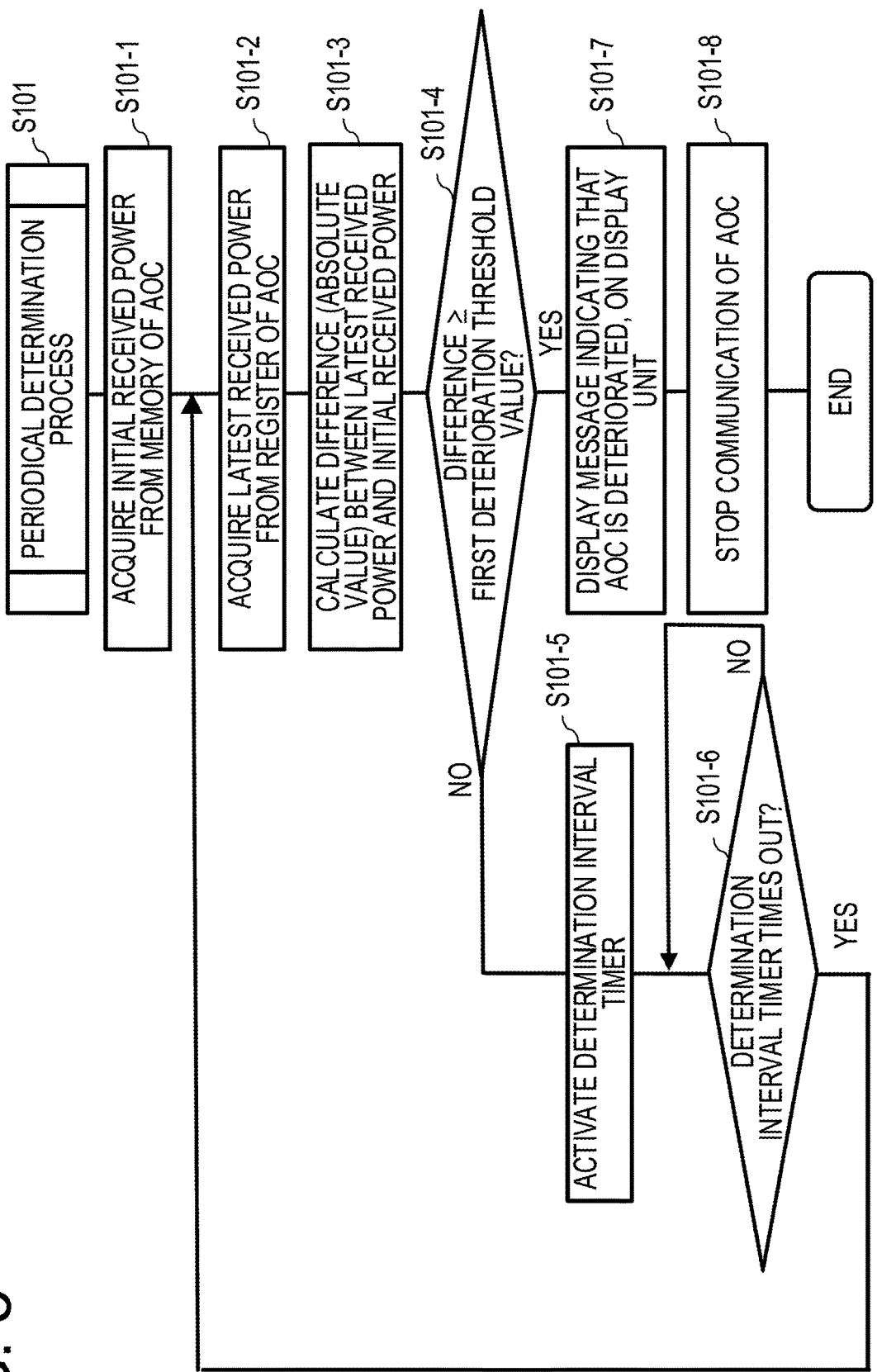
FIG. 5 is a view illustrating an example of a processing flowchart of a periodical determination process S101.

FIG. 5 is a view illustrating an example of a processing flowchart of the periodical determination process S101. The periodical determination process S101 is a process in which the communication apparatus 200 periodically determines whether the AOC 100 is deteriorated.

In the periodical determination process S101, the communication apparatus 200 acquires the initial received power from the memory of the AOC 100 (S101-1). Step S101-1 is the same as step S100-2 in FIG. 4.

The communication apparatus 200 acquires the latest received power from the register of the AOC 100 (S101-2). Step S101-2 is the same as step S100-4 in FIG. 4.

The communication apparatus 200 calculates a difference between the latest received power and the initial received power (S101-3). The difference calculated by the communication apparatus 200 is an absolute value obtained by subtracting the initial received power from the latest received power.

The communication apparatus 200 compares the calculated difference with a first deterioration threshold value (S101-4). The first deterioration threshold value (first threshold value) is a threshold value indicating whether the AOC 100 is deteriorated. For example, the first deterioration threshold value is a numerical value indicating that the AOC 100 is deteriorated and desired received power (or transmitted power) cannot be obtained when the calculated difference is equal to or greater than the first deterioration threshold value.

When it is determined that the calculated difference is smaller than the first deterioration threshold value ("No" in S101-4), the communication apparatus 200 activates a determination interval timer (S101-5). The determination interval timer is a periodic timer until the communication apparatus 200 performs the next deterioration determination.

For example, deterioration (or defect) of the AOC 100 due to manufacturing defect may be detected in the initial stage before the periodical determination process. In addition, for example, deterioration of the AOC 100 due to shocks has an indefinite generation timing and it is difficult to set an appropriate determination cycle for the deterioration. In the first embodiment, the communication apparatus 200 assumes deterioration (aged deterioration) due to use of the AOC 100 or due to lapse of time after the use starts. Therefore, the determination interval timer is assumed to be a timer in consideration of gradual deterioration of the AOC 100. In the first embodiment, for example, the communication apparatus 200 sets the determination interval timer to 24 hours, which is a sufficiently shorter period than the guarantee period (e.g., 5 years) of the manufacturer of the AOC 100. In the periodical deterioration determination, the communication apparatus 200 may store the difference in the internal memory of the communication apparatus 200, monitor the variation of the difference, and predict the deterioration of the AOC 100.

The communication apparatus 200 waits for the determination interval timer to time out ("No" in S101-6). When the determination interval timer times out ("Yes" in S101-6), the communication apparatus 200 executes the deterioration determination process after step S101-2.

In the meantime, when it is determined that the calculated difference is equal to or greater than the first deterioration threshold value ("Yes" in S101-4), the communication apparatus 200 displays on a display unit a message indicating that the AOC 100 is deteriorated (S101-7), stops the communication using the AOC 100 (S101-8), and ends the process.

By displaying the message on the display unit, the communication apparatus 200 may notify the user of the communication apparatus 200 that the AOC 100 is deteriorated, and prompt the user to exchange the AOC 100 or prepare for exchange of the AOC 100. Further, the communication apparatus 200 may prevent deterioration of operation precision at an early stage by stopping the communication using the AOC 100, for example.

In the first embodiment, the communication apparatus 200 may store the initial received power in the nonvolatile memory of the AOC 100, so that, even when the AOC 100 is connected to or disconnected from the other communication apparatus 200, the initial received power may be stored in the AOC itself. As a result, the communication apparatus 200 may acquire the initial received power of the connected AOC 100, and may calculate the difference from the initial received power. The communication apparatus 200 may make a determination on the deterioration of the AOC 100 by calculating the difference.

[Modification of In-Operation Deterioration Determination Process]

The communication apparatus 200 may make a determination on the deterioration of the AOC 100 in two stages. The communication apparatus 200 provides a second deterioration threshold value indicating that the AOC 100 begins to be deteriorated (not so deteriorated to stop the operation but deteriorated to some extents), in addition to the first deterioration determination threshold value at which the operation of the AOC 100 is stopped. This modification is different from the first embodiment in terms of the periodical determination process S101 of the communication apparatus 200 and therefore, the periodic determination process S101 will be described below.

Figure 6:
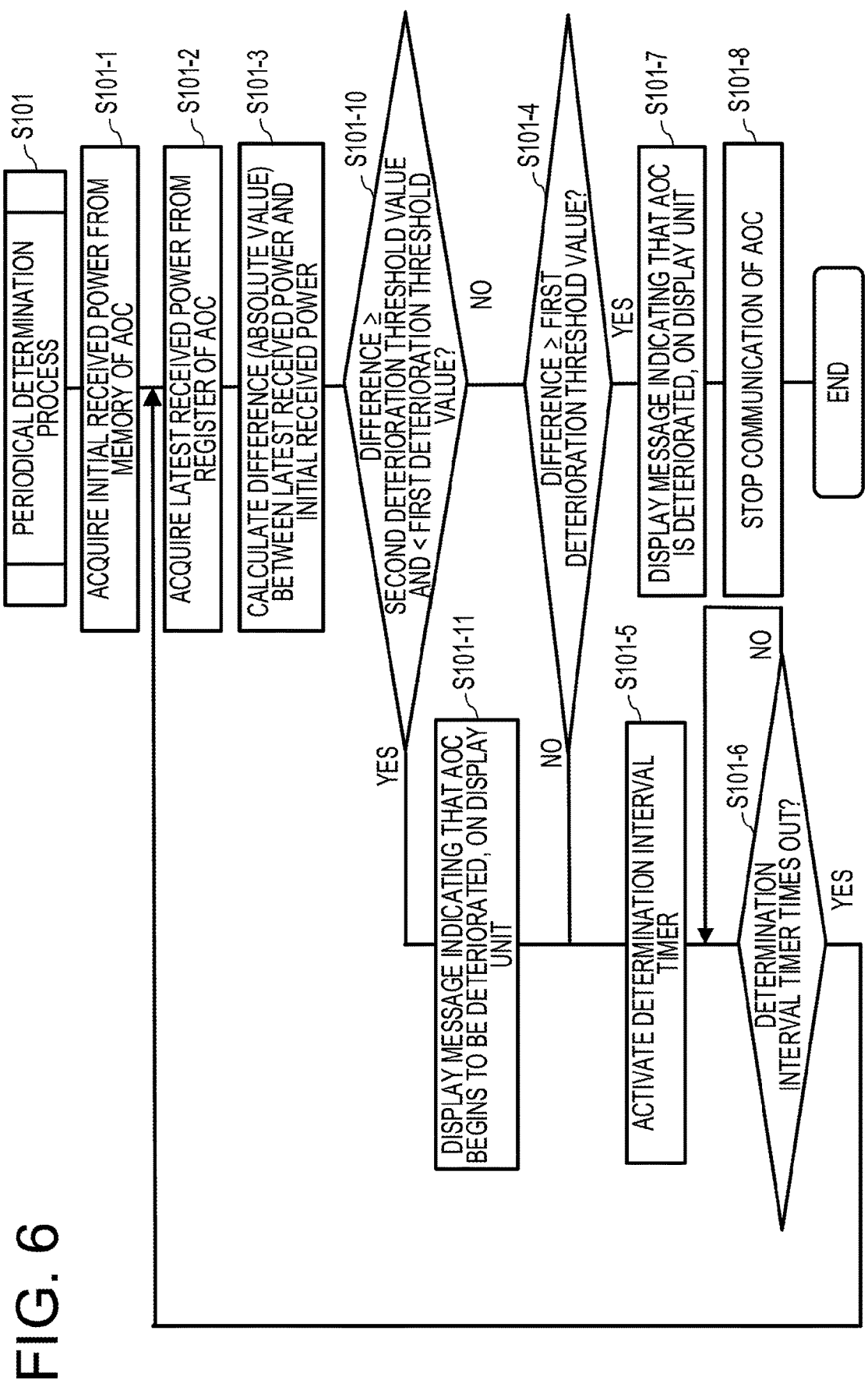
FIG. 6 is a view illustrating an example of a processing flowchart of a periodical determination process S101 according to a modification.

FIG. 6 is a view illustrating an example of a processing flowchart of the periodic determination process S101 in the modification. Steps S101-1 to S101-8 in FIG. 6 are the same as steps S101-1 to S101-8 in FIG. 5.

The periodical determination process S101 in the modification performs steps S101-10 and S101-11 after performing step S101-3. The communication apparatus 200 checks whether the difference calculated in step S101-3 is equal to or greater than the second deterioration threshold and smaller than the first deterioration threshold value (S101-10). That is, the communication apparatus 200 determines whether the AOC 100 is deteriorated (or begins to be deteriorated) to such an extent that the difference is equal to or greater than the second deterioration threshold value although the AOC 100 is not deteriorated as the difference becomes equal to or greater than the first deterioration threshold value.

When it is determined that the calculated difference is equal to or greater than the second deterioration threshold value and smaller than the first deterioration threshold value ("Yes" in S101-10), the communication apparatus 200 displays on the display unit a message indicating that the AOC 100 begins to be deteriorated (S101-11). By displaying on the display unit the message indicating that the AOC 100 begins to be deteriorated, the user of the communication apparatus 200 may be prompted to prepare a new AOC 100 before the old AOC 100 is deteriorated as the difference becomes equal to or greater than the first deterioration threshold value.

In the meantime, when it is determined that the calculated difference is not equal to or greater than the second deterioration threshold value and not smaller than the first deterioration threshold value ("No" in S101-10), the communication apparatus 200 compares the difference with a first threshold value (S101-4). Thereafter, the communication apparatus 200 performs the same processing as steps S101-5 to S101-8 in FIG. 5.

When it is determined that the calculated difference is smaller than the first deterioration threshold value ("No" in S101-4), the communication apparatus 200 activates the determination interval timer (S101-5).

The communication apparatus 200 waits for the determination interval timer to time out ("No" in S101-6). When the determination interval timer times out ("Yes" in S101-6), the communication apparatus 200 executes the deterioration determination process after step S101-2.

In the meantime, when it is determined that the calculated difference is equal to or greater than the first deterioration threshold value ("Yes" in S101-4), the communication apparatus 200 displays on the display unit a message indicating that the AOC 100 is deteriorated (S101-7), stops the communication using the AOC 100 (S101-8), and ends the process.

By displaying the message on the display unit, the communication apparatus 200 may notify the user of the communication apparatus 200 that the AOC 100 is deteriorated, and prompt the user to exchange the AOC 100 or prepare for exchange of the AOC 100. Further, for example, the communication apparatus 200 may prevent deterioration of operation precision at an early stage by stopping the communication using the AOC 100.

In the modification, the communication apparatus 200 may detect a previous stage where the AOC 100 is deteriorated, and may give the user of the communication apparatus 200 a time for which the user prepares a new AOC 100 before the old AOC 100 is deteriorated.

It has been illustrated in the first embodiment that the communication apparatus 200 makes a determination on deterioration of the AOC 100. However, the communication apparatus 200 may make a determination on deterioration of any cable as long as it may be determined whether the cable is deteriorated with the received power.

Second Embodiment

Next, a second embodiment will be described. In the second embodiment, an inspection apparatus determines whether an AOC is deteriorated.

[Configuration Example of Communication System]

Figure 7:
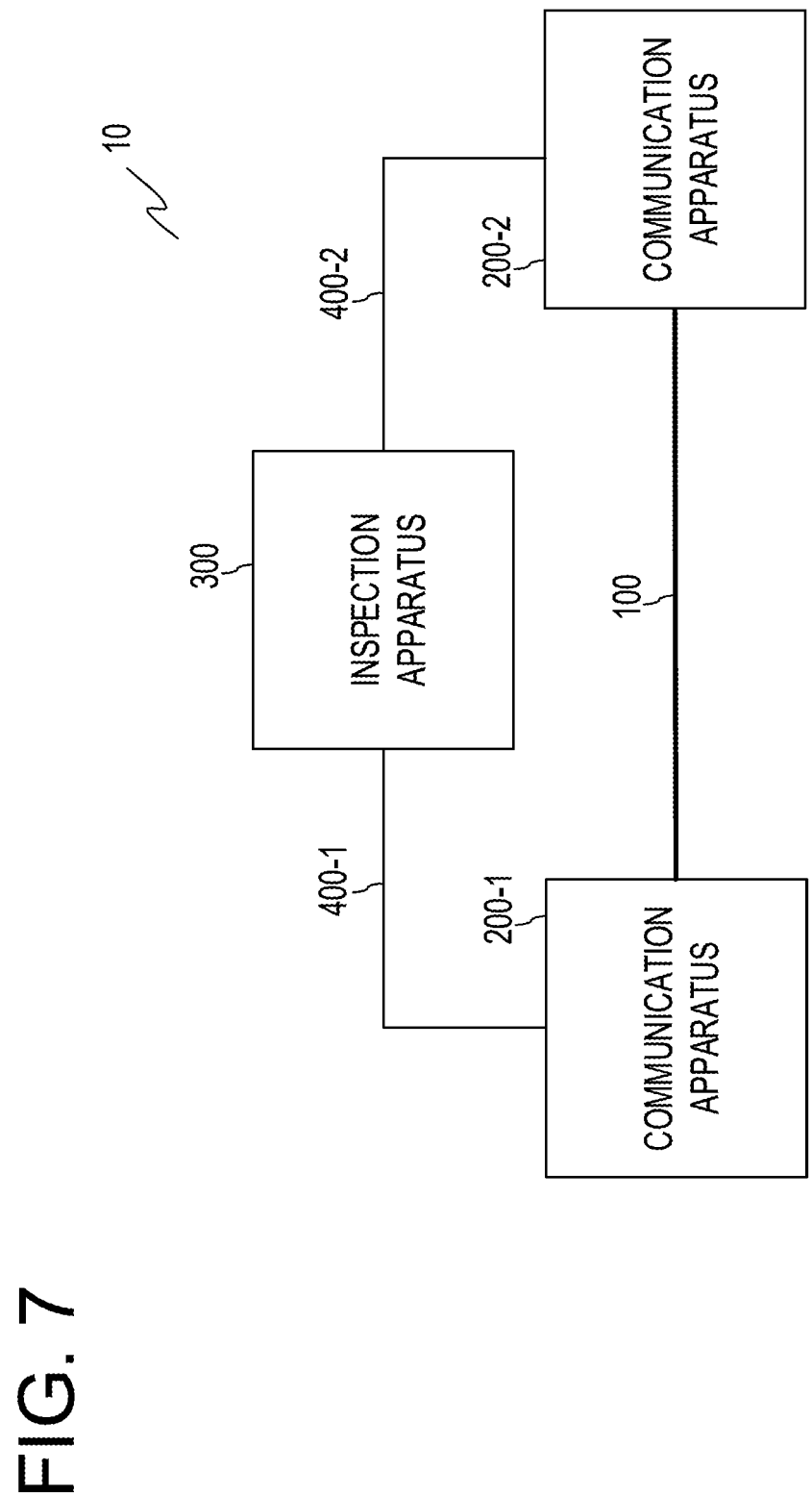
FIG. 7 is a view illustrating a configuration example of a communication system 10.

FIG. 7 is a view illustrating a configuration example of a communication system 10. The communication system 10 includes communication apparatuses 200-1 and 200-2, an AOC 100, and an inspection apparatus 300.

The communication apparatuses 200-1 and 200-2 and the AOC 100 have the same configurations as the communication apparatuses 200-1 and 200-2 and the AOC 100 illustrated in FIG. 1, respectively. The inspection apparatus 300 is connected to the communication apparatuses 200-1 and 200-2 via cables 400-1 and 400-2, respectively.

The inspection apparatus 300 makes a determination on whether the AOC 100 is deteriorated. The opportunity for this determination on deterioration is, for example, a user operation such as a command input by the user of the inspection apparatus 300 or a button press. The opportunity for the determination on deterioration may be, for example, when connecting with the communication apparatuses 200-1 and 200-2.

For example, when a difference between the initial received power and the latest received power in the AOC 100 is equal to or greater than a predetermined value, the inspection apparatus 300 determines that the AOC 100 is deteriorated.

[Configuration Example of Inspection Apparatus]

Figure 8:
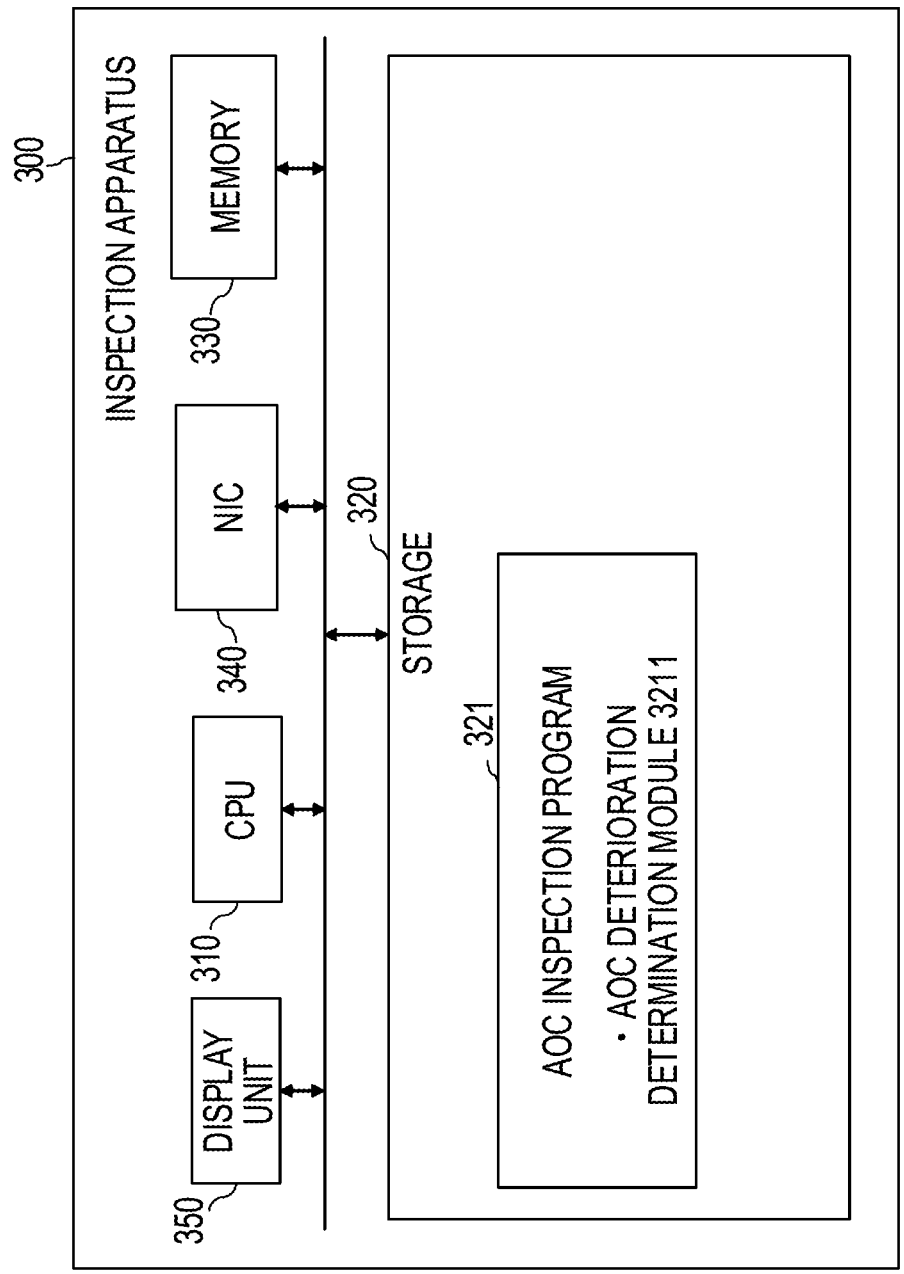
FIG. 8 is a view illustrating a configuration example of an inspection apparatus 300.

FIG. 8 is a view illustrating a configuration example of the inspection apparatus 300. The inspection apparatus 300 is, for example, a computer and includes a CPU 310, a storage 320, a memory 330, an NIC (Network Interface Card) 340, and a display unit 350.

The storage 320 is an auxiliary storage device such as a flash memory, an HDD, or an SSD that stores programs and data. The storage 320 stores an AOC inspection program 321.

The memory 330 is an area into which the programs stored in the storage 320 are loaded. The memory 330 and the programs are also used as an area that stores data.

The NIC 340 is an interface connected to another communication apparatus 200. The inspection apparatus 300 communicates with the communication apparatus 200-1 and the communication apparatus 200-2 by connecting the NIC 340 to the communication apparatus 200-1 and the communication apparatus 200-2.

The CPU 310 is a processor that loads the programs stored in the storage 320 into the memory 330 and executes the loaded programs to implement each process.

By executing the AOC inspection program 321, the CPU 310 constructs a storage controller and a cable controller and performs an AOC inspection process. The AOC inspection process is a process of inspecting the AOC 100 connecting between the communication apparatuses 200. The inspection apparatus 300 acquires the initial received power and the latest received power of the AOC 100 from the communication apparatus 200. For example, in response to a request from the inspection apparatus 300, the communication apparatus 200 reads the initial received power and the latest received power from the AOC 100, and returns the read value to the inspection apparatus 300. In addition, in the AOC inspection process, the inspection apparatus 300 determines whether the AOC 100 between the communication apparatuses 200 is deteriorated.

By executing an AOC deterioration determination module 3211 included in the AOC inspection program 321, the CPU 310 constructs the storage controller and the cable controller, and performs an AOC deterioration determination process. The AOC deterioration determination process is a process of determining whether the AOC connecting between the communication apparatuses 200 is deteriorated. In the AOC inspection process, the inspection apparatus 300 determines whether the AOC 100 between the communication apparatuses 200 is deteriorated.

[Configuration Example of Communication Apparatus]

Figure 9:
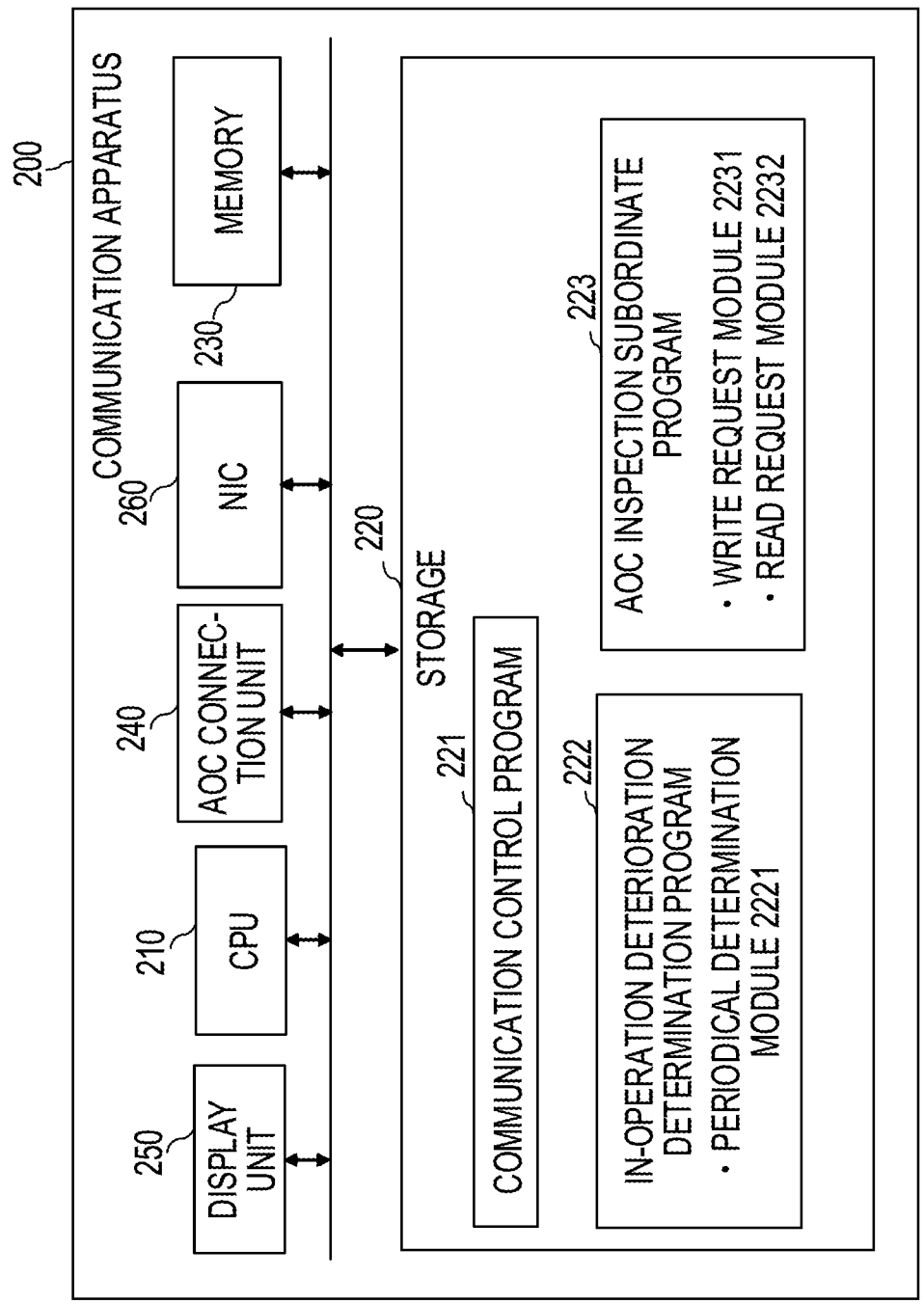
FIG. 9 is a view illustrating a configuration example of a communication apparatus 200.

FIG. 9 is a view illustrating a configuration example of the communication apparatus 200. The communication apparatus 200 is, for example, a computer and includes a CPU 210, a storage 220, a memory 230, an AOC connection unit 240, and an NIC (Network Interface Card). The CPU 210, the storage 220, the memory 230, and the AOC connection unit 240 have the same configurations as the CPU 210, the storage 220, the memory 230, and the AOC connection unit 240 illustrated in FIG. 2, respectively.

The NIC 260 is an interface connected to the inspection apparatus 300. The communication apparatus 200 communicates with the inspection apparatus 300 by connecting the NIC 260 to the inspection apparatus 300.

By executing an AOC check subordinate program 223, the CPU 210 constructs a reading unit and a writing unit, and performs an AOC inspection subordinate process. The AOC inspection subordinate process is a process of reading the initial received power or the latest received power from a memory or register of the AOC 100, or writing the initial receiving power to the memory of the AOC 100 according to an instruction (request) from the inspection apparatus 300.

By executing a write request module 2231 included in the AOC inspection subordinate program 223, the CPU 210 constructs the writing unit and performs a write request process. The write request process is a process of writing the initial received power in the memory of the AOC 100 according to an instruction (request) from the inspection apparatus 300.

By executing a read request module 2232 included in the AOC inspection subordinate program 223, the CPU 210 constructs the reading unit and performs a read request process. The read request process is a process of reading the initial received power or the latest received power from the memory or register of the AOC 100 according to an instruction (request) from the inspection apparatus 300, and notifying the read value to the inspection apparatus 300.

[AOC Inspection Process]

The inspection apparatus 300 is connected to the communication apparatus 200 and performs the AOC inspection process (S200). In the following description, a case where one communication apparatus 200 is connected will be described, but two or more communication apparatuses may be connected.

Figure 10:
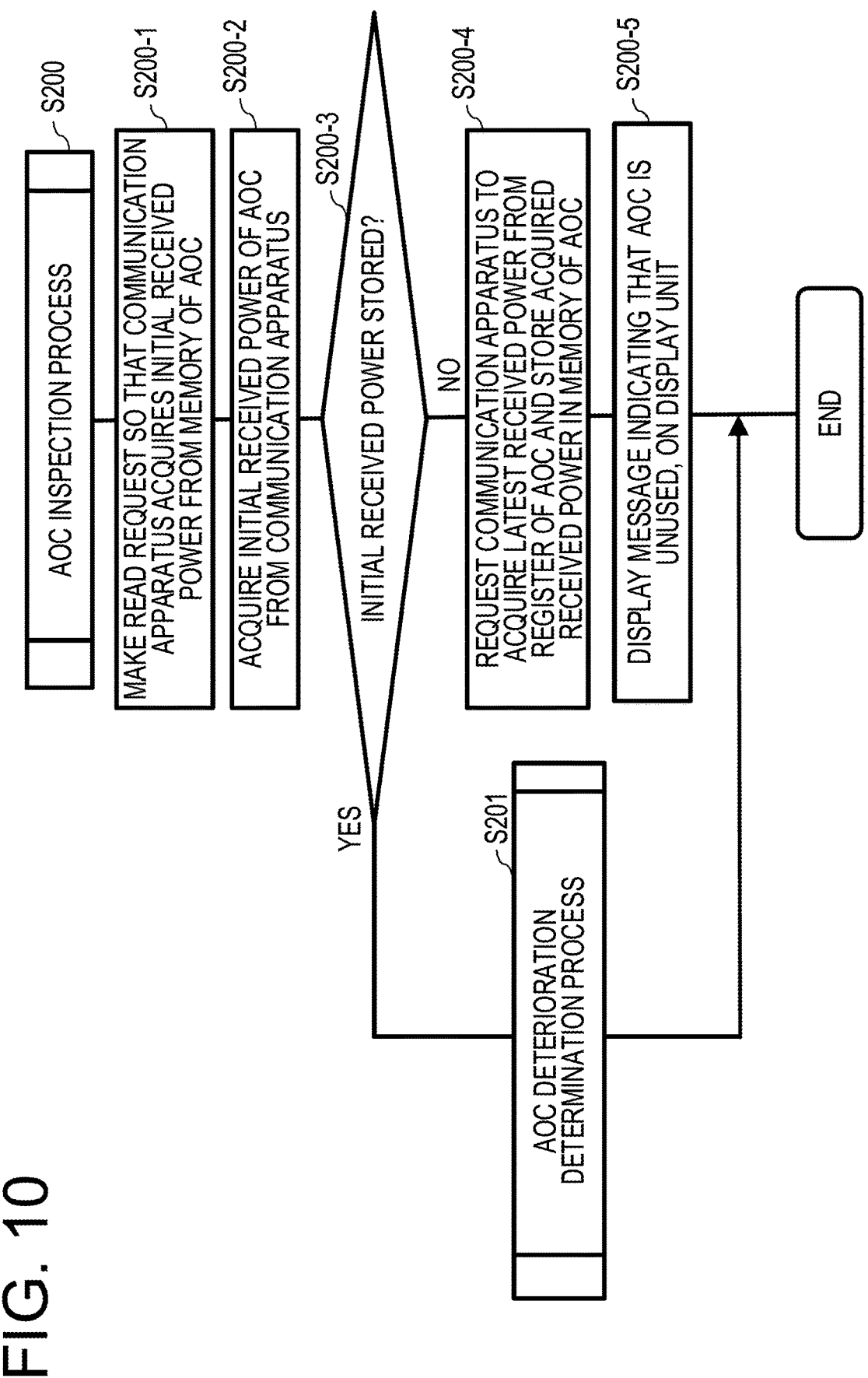
FIG. 10 is a view illustrating an example of a processing flowchart of an AOC inspection process S200.

FIG. 10 is a view illustrating an example of a processing flowchart of the AOC inspection process S200. In the AOC inspection process S200, the inspection apparatus 300 makes a read request so that the communication apparatus 200 acquires the initial received power from the memory of the AOC 100 (S200-1).

Upon receiving the read request, the communication apparatus 200 acquires the initial received power by reading an area of the memory of the AOC that stores the initial received power. The communication apparatus 200 notifies the acquired initial received power to the inspection apparatus 300.

The inspection apparatus 300 receives the notification from the communication apparatus 200 and acquires the initial received power of the AOC 100 (S200-2). Then, the inspection apparatus 300 checks whether the initial received power has been stored in the memory of the AOC 100 (S200-3). When the value of the initial received power acquired in step S200-2 is an initial value (e.g., 0), the inspection apparatus 300 determines that the initial received power has not been stored in the memory (i.e., an unconnected state).

When it is determined that the initial received power has not been stored ("No" in S200-3), the inspection apparatus 300 acquires the latest received power from the register of the AOC 100 and stores the acquired latest received power as the initial received power in the memory of the AOC 100 (S200-4).

Then, the inspection apparatus 300 displays on the display unit of the inspection apparatus 300 a message indicating that the AOC 100 is unused (S200-5) and ends the process.

When it is determined that the initial received power has been stored ("Yes" in S200-3), the inspection apparatus 300 performs the AOC deterioration determination process (S201) and ends the process.

Figure 11:
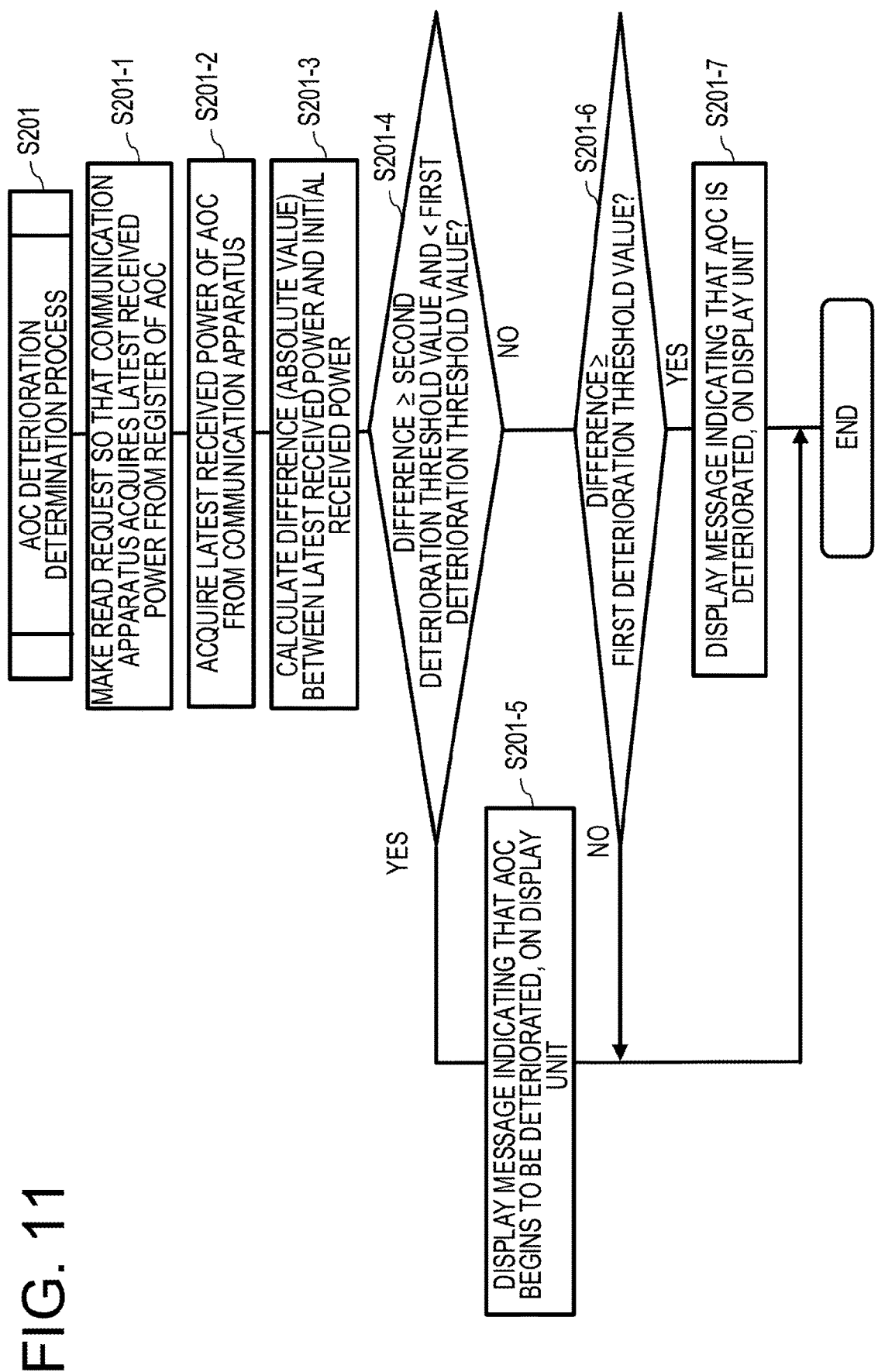
FIG. 11 is a view illustrating an example of a processing flowchart of an AOC deterioration determination process S201.

FIG. 11 is a view illustrating an example of a processing flowchart of the AOC deterioration determination process S201. In the AOC deterioration determination process S201, the inspection apparatus 300 makes a read request so that the communication apparatus 200 acquires the latest received power from the register of the AOC 100 (S201-1).

Upon receiving the read request, the communication apparatus 200 acquires the latest received power by reading an area of the register of the AOC 100 that stores the latest received power. The communication apparatus 200 notifies the acquired latest received power to the inspection apparatus 300.

The inspection apparatus 300 receives the notification from the communication apparatus 200 and acquires the latest received power of the AOC (S201-2). Then, the inspection apparatus 300 calculates a difference between the latest received power and the initial received power (S201-3). The difference calculated by the inspection apparatus 300 is an absolute value obtained by subtracting the initial received power from the latest received power. The initial received power has already been acquired in step S200-2 in FIG. 10.

When it is determined that the calculated difference is equal to or greater than the second deterioration threshold value and smaller than the first deterioration threshold value ("Yes" in S201-4), the inspection apparatus 300 displays on the display unit a message indicating that the AOC 100 begins to be deteriorated (S201-5).

In the meantime, when it is determined that the calculated difference is not equal to or greater than the second deterioration threshold value and not smaller than the first deterioration threshold value ("No" in S201-4), the inspection apparatus 300 compares the difference with the first threshold value (S201-6). When it is determined that the calculated difference is smaller than the first deterioration threshold value ("No" in S201-4), the inspection apparatus 300 ends the process. The inspection apparatus 300 may display a message indicating that the AOC 100 has not yet been deteriorated.

In the meantime, when it is determined that the calculated difference is equal to or greater than the first deterioration threshold value ("Yes" in S201-6), the inspection apparatus 300 displays on the display unit a message indicating that the AOC 100 is deteriorated (S201-7), and ends the process. The inspection apparatus 300 may instruct the communication apparatus 200 to stop the communication using the AOC 100 in step S201-7.

In the second embodiment, instead of the communication apparatus 200, the inspection apparatus 300 may inspect the AOC 100 without stopping the communication and processing between the communication apparatuses 200.

Third Embodiment

Next, a third embodiment will be described. In the third embodiment, some or all of the inspection on the AOC 100 is performed by a control IC (Integrated Circuit) which is a dedicated circuit.

Figure 12:
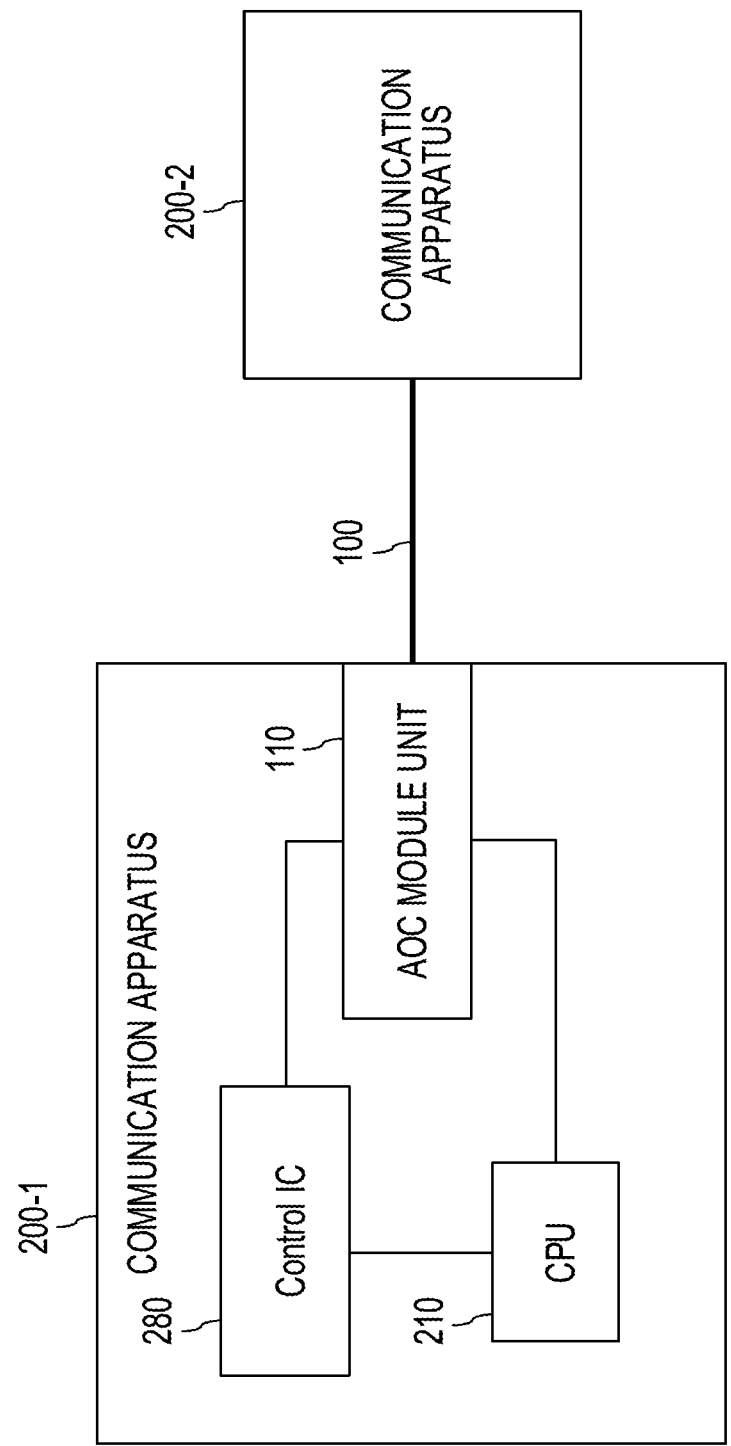
FIG. 12 is a view illustrating a configuration example of communication apparatuses 200-1 and 200-2 and an AOC 100.

FIG. 12 is a view illustrating a configuration example of the communication apparatuses 200-1 and 200-2 and the AOC 100. The AOC module 110 of the AOC 100 is connected to the AOC connection unit 240 of the communication apparatus 200-1.

The AOC module 110 has the same configuration as the AOC module 110 illustrated in FIG. 3. The CPU 210 has the same configuration as the CPU 210 illustrated in FIG. 2. The configuration of the communication apparatus 200-2 will be omitted.

The communication apparatus 200 includes a control IC 280. The control IC 280 is a dedicated circuit for the communication apparatus 200 to control the AOC 100 or the AOC module 110. The control IC 280 may access a memory or register of the AOC module for data reading and writing. In addition, the control IC 280 may access the memory or register of the AOC module according to instructions from the CPU 210. The CPU 210 transmits a control signal to the control IC 280 and requests an access to the memory or register of the AOC 100.

In the third embodiment, for example, some or all of the in-operation deterioration determination process S100, the periodical determination process S101, the AOC inspection process S200, and the AOC deterioration determination process S201 in the first and second embodiments are executed by the control IC 280.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus of a first information processing apparatus coupled to a second information processing apparatus via an optical fiber, the information processing apparatus comprising:
a first memory;
a second memory different from the first memory; and
a processor coupled to the first and second memories and the processor configured to:
store, into the first memory, a first reception power of an optical signal received via the optical fiber as an initial reception power when an initial value is stored in the first memory;
store, into the second memory, a second reception power of the optical signal received via the optical fiber through which the optical signal of the first reception power is received when the first reception power is stored in the first memory; and
stop receiving the optical signal when a difference between the first reception power and the second reception power is equal to or greater than a first threshold value.

2. The information processing apparatus according to claim 1, wherein the processor is configured to store the second reception power and stop receiving the optical signal when the difference is equal to or greater than the first threshold value at predetermined time intervals.

3. The information processing apparatus according to claim 1, wherein the processor is further configured to display a message to indicate that the optical fiber is deteriorated when the difference is equal to or greater than the first threshold value.

4. The information processing apparatus according to claim 1, wherein the processor is further configured to display a message to indicate that the optical fiber begins to be deteriorated when the difference is smaller than the first threshold value and equal to or greater than a second threshold value.

5. The information processing apparatus according to claim 1, wherein the first memory is a nonvolatile memory.

6. The information processing apparatus according to claim 1, wherein the initial value is stored in the first memory before the first reception power is stored in the first memory and the second reception power is stored in the second memory.

7. The information processing apparatus according to claim 1, further comprising:
a circuit configured to convert an optical signal received via the optical fiber to an electric signal.

8. An optical fiber inspection method comprising:
storing, into a first memory, a first reception power of an optical signal received via an optical fiber as an initial reception power when an initial value is stored in the first memory;
storing, into a second memory different from the first memory, a second reception power of the optical signal received via the optical fiber through which the optical signal of the first reception power is received when the first reception power is stored in the first memory; and
stopping receiving the optical signal when a difference between the first reception power and the second reception power is equal to or greater than a first threshold value, by a processor.

9. A non-transitory computer-readable recording medium storing a program that causes a computer to execute a procedure, the procedure comprising:
storing, into a first memory, a first reception power of an optical signal received via an optical fiber as an initial reception power when an initial value is stored in the first memory;

storing, into a second memory different from the first memory, a second reception power of the optical signal received via the optical fiber through which the optical signal of the first reception power is received when the first reception power is stored in the first memory; and
stopping receiving the optical signal when a difference between the first reception power and the second reception power is equal to or greater than a first threshold value.

* * * * *